United States Patent [19]

Ohki et al.

[11] Patent Number: 4,689,671
[45] Date of Patent: Aug. 25, 1987

[54] CODING APPARATUS FOR MOVING OBJECT IMAGE

[75] Inventors: Junichi Ohki; Akihiro Furukawa, both of Tokyo, Japan

[73] Assignee: NEC Corporation, Tokyo, Japan

[21] Appl. No.: 878,753

[22] Filed: Jun. 26, 1986

[30] Foreign Application Priority Data

| Jun. 27, 1985 | [JP] | Japan | 60-140971 |
| Jul. 9, 1985 | [JP] | Japan | 60-152021 |
| Jul. 9, 1985 | [JP] | Japan | 60-152022 |

[51] Int. Cl.$^4$ .................................. H04N 7/13
[52] U.S. Cl. ..................... 358/135; 358/105; 358/136; 358/167; 358/183; 375/27
[58] Field of Search ............. 358/133, 135, 136, 105, 358/138, 167, 182, 183; 375/27

[56] References Cited

U.S. PATENT DOCUMENTS

| 4,307,420 | 12/1981 | Ninomiya et al. | 358/136 |
| 4,460,923 | 7/1984 | Hirano | 358/136 |
| 4,494,144 | 1/1985 | Brown | 358/133 |
| 4,575,756 | 3/1986 | Furukawa | 358/136 |
| 4,591,907 | 5/1986 | Catros | 358/136 |
| 4,636,862 | 1/1987 | Hatori | 358/105 |

OTHER PUBLICATIONS

IEEE Transaction on Communication, vol. COM-33, No. 11, Nov. 1985.

*Primary Examiner*—Howard W. Britton
*Attorney, Agent, or Firm*—Sughrue, Mion, Zinn, Macpeak, and Seas

[57] ABSTRACT

A coding apparatus for a moving object image input signal such as a television signal detects an uncovered background area appearing upon movement of a moving object in the moving object image input signal and encodes an image signal corresponding to the uncovered background area according to intraframe correlation instead of interframe correlation. The coding apparatus includes a noise reduction circuit for decreasing a noise reduction level for the signal corresponding to the uncovered background area.

8 Claims, 15 Drawing Figures

FIG. 3

| AREA FRAME | (1) MC | (1) FF | (2) MC | (2) FF | (3) MC | (3) FF | (4) MC | (4) FF | (5) MC | (5) FF | (6) MC | (6) FF |
|---|---|---|---|---|---|---|---|---|---|---|---|---|
| F0~F1 | S | S | S | L | S | L | S | L | S | S | S | S |
| F1~F2 | S | S | L | L | S | L | S | L | S | L | S | S |
| F2~F3 | S | S | S | S | L | L | S | L | S | L | S | S |
| F3~F4 | S | S | S | S | S | S | S | S | S | S | S | S |

MC: COMPARED RESULT OF MOTION COMPENSATED PREDICTION ERROR
FF: COMPARED RESULT OF INTERFRAME DIFFERENCE
S: SMALLER  L: LARGER

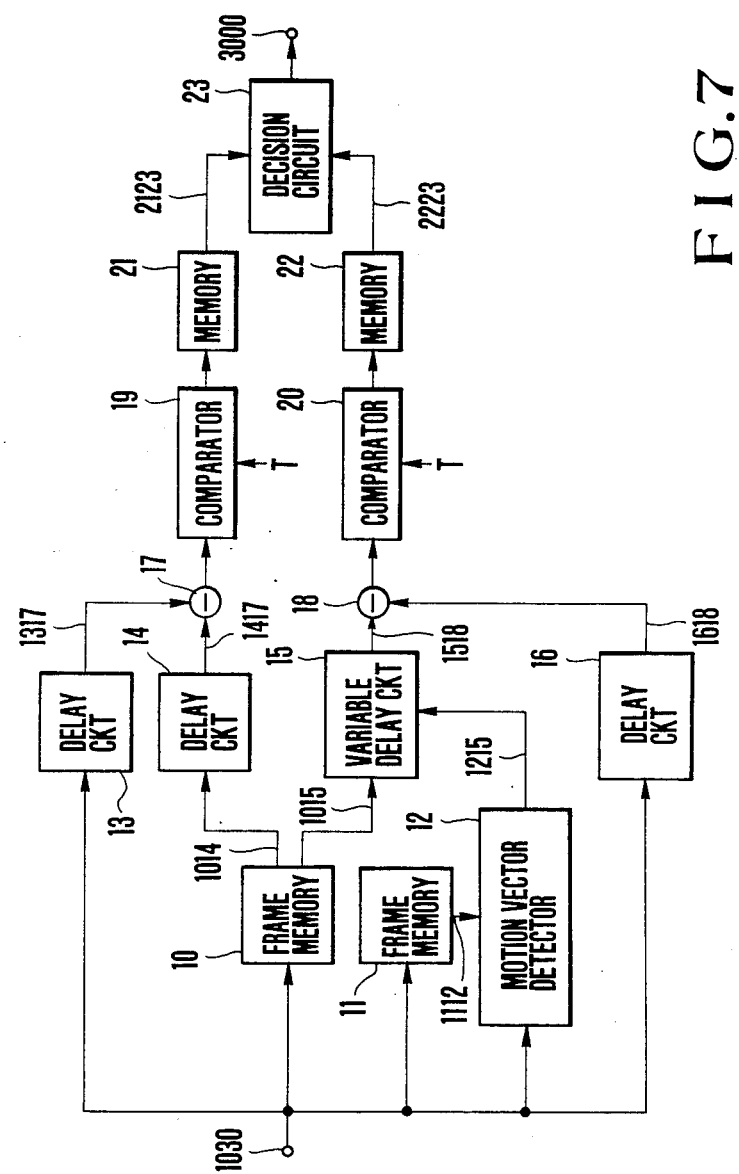
F I G. 7

| OUTPUT | A7 | A6 | A5 | A4 | A3 | A2 | A1 | A0 | ADDRESS (DECIMAL) |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 1 | 1 |
| 0 | 0 | 0 | 0 | 0 | 0 | 0 | 1 | 0 | 2 |
| ⸺ | ⸺ | | | | ⸺ | | | | ⋮ |
| 0 | 0 | 0 | 1 | 1 | 0 | 0 | 0 | 1 | 49 |
| 0 | 0 | 0 | 1 | 1 | 0 | 0 | 1 | 0 | 50 |
| 0 | 0 | 0 | 1 | 1 | 0 | 0 | 1 | 1 | 51 |
| ⸺ | ⸺ | | | | ⸺ | | | | ⋮ |
| 0 | 0 | 1 | 1 | 1 | 0 | 0 | 1 | 1 | 115 |
| 1 | 0 | 1 | 1 | 1 | 0 | 1 | 0 | 0 | 116 |
| 0 | 0 | 1 | 1 | 1 | 0 | 1 | 0 | 1 | 117 |
| ⸺ | ⸺ | | | | ⸺ | | | | ⋮ |
| 0 | 1 | 1 | 1 | 1 | 1 | 1 | 1 | 1 | 255 |

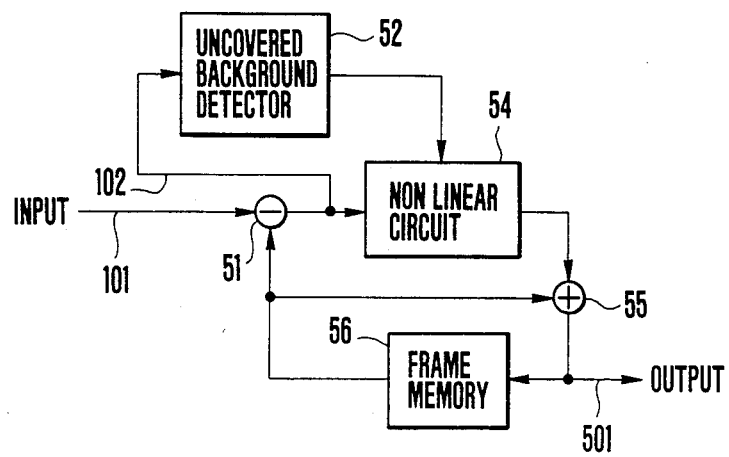
F I G.12
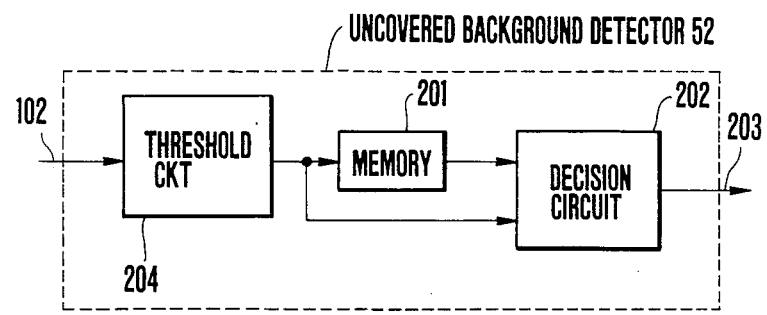
F I G.13

CODING APPARATUS FOR MOVING OBJECT IMAGE

BACKGROUND OF THE INVENTION

The present invention relates to a coding apparatus for a moving object image signal and, more particularly, to a coding apparatus for a moving object image signal wherein high coding efficiency and high image quality can be provided for an uncovered background appearing from behind a moving object on a screen.

A conventional motion compensated interframe coding scheme has been used to compress a television signal or the like with high efficiency and to transmit the compressed television signal. According to this scheme, as described in U.S. Pat. No. 4,307,420 (Dec. 22, 1981) issued to Ninomiya et al, a bandwidth can be effectively compressed by utilizing interframe correlation of a moving object image signal.

Another conventional scheme for further effectively compressing a bandwidth is a combination of predictive coding using interframe correlation and coding using intraframe correlation (to be referred to as a hybrid coding scheme hereinafter), as described in IEEE Transactions on Communications, Vol. COM-29, No. 12, December 1981, pp. 1799-1808. In general, the screen includes a still image area such as a background, a moving image area of a moving object, and an uncovered background area appearing from behind the moving object. In the uncovered background area, interframe correlation cannot be established. Thus, the conventional interframe predictive coding and the hybrid coding scheme cannot provide satisfactory coding efficiency.

In a conventional coding scheme using interframe correlation, an arrangement shown in FIG. 1 is employed to reduce noise. Referring to FIG. 1, a nonlinear circuit 1 having nonlinear characteristics is used. In this circuit, if an interframe image signal difference is small, the gain is not larger than 1 (e.g., ¼ to ½). However, if the interframe difference is large, the gain becomes 1. In the succeeding two frames, between which an object is moving, a background portion behind the moving object in the first frame appears in the second frame. In the conventional noise reduction circuit in FIG. 1, even a small interframe difference is detected as noise, and the gain of the nonlinear circuit is set to be less than 1. A signal distortion appears on the screen, i.e., providing a tail following the moving object, thus resulting in a poor image.

Summary of the Invention

It is an object of the present invention to provide a coding apparatus wherein efficiency degradation of interframe predictive coding and hybrid coding in an uncovered background from behind a moving object image are eliminated.

It is another object of the present invention to provide a coding apparatus having a noise reduction circuit for preventing degradation of image quality in the uncovered background from behind a moving object image.

According to an aspect of the present invention, there is provided a hybrid coding apparatus including detecting means for receiving a moving object image input signal and detecting an uncovered background appearing after movement of a moving object, means for predictive coding an interframe correlation according to the input signal, means for selecting one of an output signals from the predictive coding means and the input signal in response to an output signal from the detecting means, and means for coding the output signal from the selecting means according to an intraframe correlation.

According to another aspect of the present invention, there is provided an adaptive predictive coding apparatus for a moving object image signal, comprising means for performing motion compensated prediction for a moving object image signal such as a television signal and calculating a prediction error, first evaluating means for evaluating the motion compensated prediction error, means for performing interframe prediction for the moving object image signal and calculating an interframe prediction error, second evaluating means for evaluating the interframe prediction error, means for storing first and second evaluation results from the first and second evaluating means, third evaluating means for comparing the first and second evaluation results stored in the storage means and detecting an uncovered background upon movement of a moving object, means for performing predictive coding using an interframe correlation, means for performing background predictive coding using a background memory, and means for selecting predictive coding using the background memory for the uncovered background and predictive coding using the interframe correlation for other screen components.

According to still another aspect of the present invention, there is provided a coding apparatus comprising means for detecting, from an input moving object image signal, an uncovered background appearing upon movement of a moving object, and means for reducing noise of the input signal, the noise reduction means being adapted to receive a signal representing the uncovered background from the detecting means and weakening a noise reduction level.

BRIEF DESCRIPTION OF THE DRAWINGS

FIG. 3 is a table showing the results of comparison between the threshold values and the motion compensated prediction errors, and the interframe differences in the respective frames in FIG. 2;

FIG. 7 is a block diagram showing an arrangement of an uncovered background separating circuit in FIG. 6;

FIG. 12 is a block diagram of showing a noise reduction circuit in the coding apparatus according to the present invention; and FIG. 13 is a block diagram showing an embodiment of a motion detector in FIG. 12.

DETAILED DESCRIPTION OF THE PREFERRED EMBODIMENTS

Preferred embodiments of the present invention will be described with reference to the accompanying drawings.

In order to best understand the present invention, the principle of coding according to the present invention will be described below.

Uncovered background prediction is described in "Uncovered Background Prediction in Interframe Coding", IEEE Transaction on Communications, Vol. COM-33, No. 11, November 1985, pp. 1227-1231.

Uncovered background separation is performed as follows.

First, a motion compensated prediction error and an interframe difference are calculated. In this case, the motion compensated prediction error can be a prediction error calculated by the motion compensated prediction coding scheme proposed in Ninomiya's patent. More specifically, a frame is divided into blocks. A block of an immediately preceding frame which has the highest correlation with a given block of the current frame is selected. A difference between the pixel values of the identical positions of the corresponding blocks is calculated as the motion compensated prediction error. The calculation of the motion compensated prediction error is not limited to the one described above, but can be performed according to another scheme.

The interframe difference is obtained by calculating a difference between the pixel of the current frame and the pixel, located at the same position of the pixel of the current frame, of the immediately preceding frame.

In the following description, it is assumed that the motion compensated prediction error and the interframe difference have been calculated.

Figure 1:
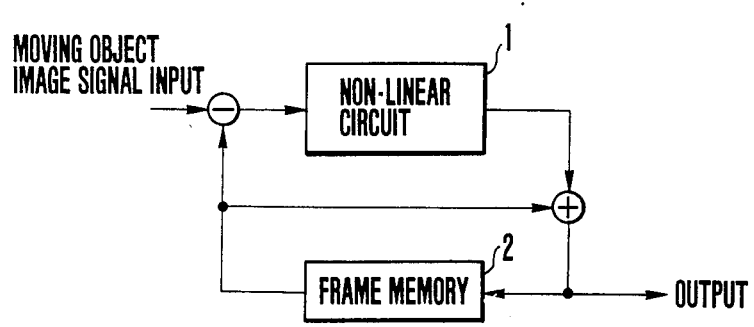
FIG. 1 is a block diagram of a conventional noise reduction circuit for a moving object image.
Figure 2:
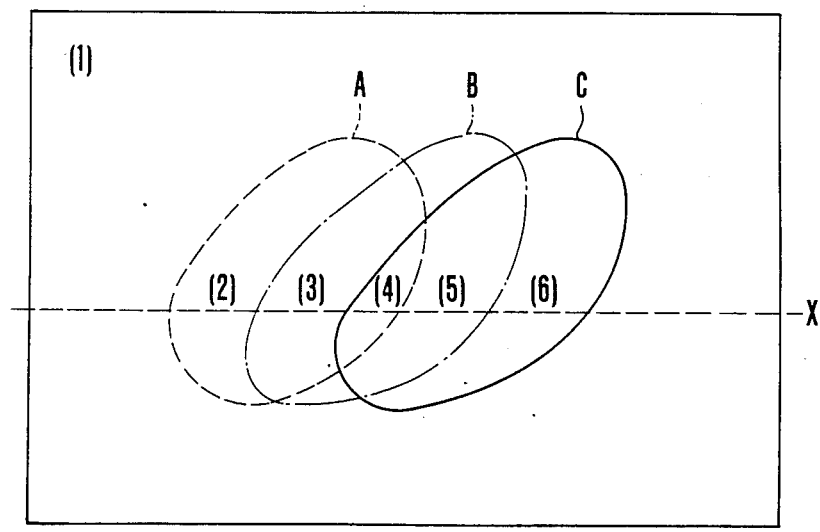
FIG. 2 is a schematic view for explaining movement of an object on a screen.

Referring to FIG. 2, positions of the moving object in a frame are superposed on a single screen, as indicated by A, B, and C, when an oblique elliptical object is moved in four succeeding frames (to be referred to F1, F2, F3, and F4) to the right and stops at the frame F3. The broken line, the alternate long and short dashed line, and the solid line represent object positions A, B, and C at the frames F1, F2, and F3. Since the object is moved to positions A, B, and C respectively corresponding to the frames F1, F2, and F3 and stops at the frame F3, the object position at the frame F4 is the same as that at the frame F3. [1] to [6] in FIG. 2 represent the moving object area and the stationary object area. [1] is the background, i.e., the stationary area throughout F1, F2, F3, and F4; [2] is an uncovered background between F1 and F2 and the background after F2; [3] is the moving object area between F1 and F2, the uncovered background between F2 and F3, and the background after F3; [4] is the moving object area throughout F1, F2, F3, and F4 (this area is an overlapping area between the positions A and C in FIG. 2); [5] (the overlapping area when the object is located at the positions B and C) is an area covered by the moving object between F1 and F2, the moving object area between F2 and F3, and the stationary area after F3; and [6] (the area in the object position C excepting the area [5]) is the background between F1 and F2, the area covered by the moving object between F2 and F3, and the stationary area after F3.

The motion compensated prediction error and the interframe difference which are calculated for a pixel near the areas [1] to [6] are compared with proper threshold values T, and the errors between the frames F1 to F4 and the variations in differences are calculated, as shown in FIG. 3. F0 is the immediately preceding frame of the frame F1 in FIG. 3.

If the object is moved as shown in FIG. 2, the motion compensated prediction errors in the uncovered background areas [2] and [3] (indicated by the thick lines in FIG. 3) to be separated are increased. Thereafter, the interframe errors are decreased. If the object continuously moves, other areas [1], [4], [5], and [6] can be discriminated in accordance with changes in interframe differences as a function of time. However, if the object stops, the interframe differences in the areas [4], [5], and [6] are decreased in the same manner as those for the uncovered background areas, and thus discrimination cannot be performed. In this case, changes in motion compensated prediction errors as a function of time are checked. When the object stops, the motion compensated prediction errors are continuously small in the areas [4], [5], and [6]. The motion compensated protection values in the actual uncovered background behaves differently from the interframe differences, which temporarily increase before they decrease.

Figure 4:
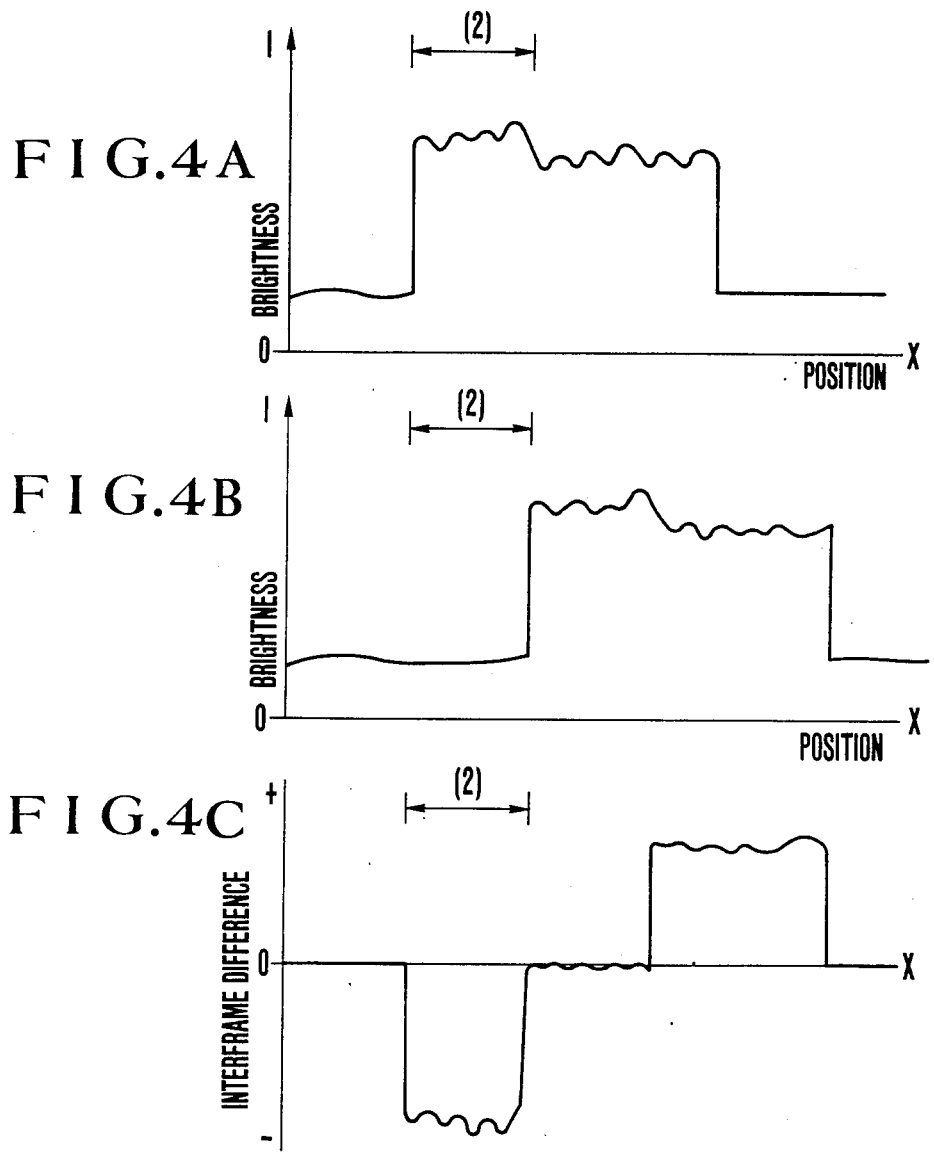
FIGS. 4A to 4C are timing charts for explaining changes in brightness levels and the interframe differences when an object is moved on the screen.

FIGS. 4A to 4C represent the brightness levels and the interframe differences of a moving object moving in the same manner as in FIG. 2. Referring to FIG. 4A, a brightness level at F2, indicated by the alternate long and short dashed line of FIG. 2, is plotted along the abscissa (X coordinate). FIG. 4B shows the brightness level at F3, and FIG. 4C shows the interframe difference at F3, i.e., a difference between the brightness levels of FIGS. 4A and 4B. [2] corresponds to the area [2] in FIG. 2 and is the uncovered background area appearing in the frame F3. As is apparent from FIGS. 4A to 4C, the uncovered background area is not associated with interframe correlation. By calculating the interframe difference, information on the area [2], i.e., the uncovered background area of the image signal (FIG. 4B) of the current frame and information on the image signal (FIG. 4A) of the immediately preceding frame are included, resulting in inefficiency. Since the uncovered background area is normally part of the background, the background areas within the frame have a small level difference, as indicated by the area [2] of FIG. 4B, thereby providing high intraframe correlation. Therefore, without calculating the interframe differences, the background area values are coded within the single frame to improve coding efficiency. In the above description, the interframe differences are exemplified. However, the motion compensated prediction errors can be used in place of the interframe differences to obtain the same results.

Transformation coding such as two-dimensional discrete cosine transformation can be used as intraframe coding. Intraframe coding using differences between adjacent signals within a frame or the like can also be used.

Figure 5:
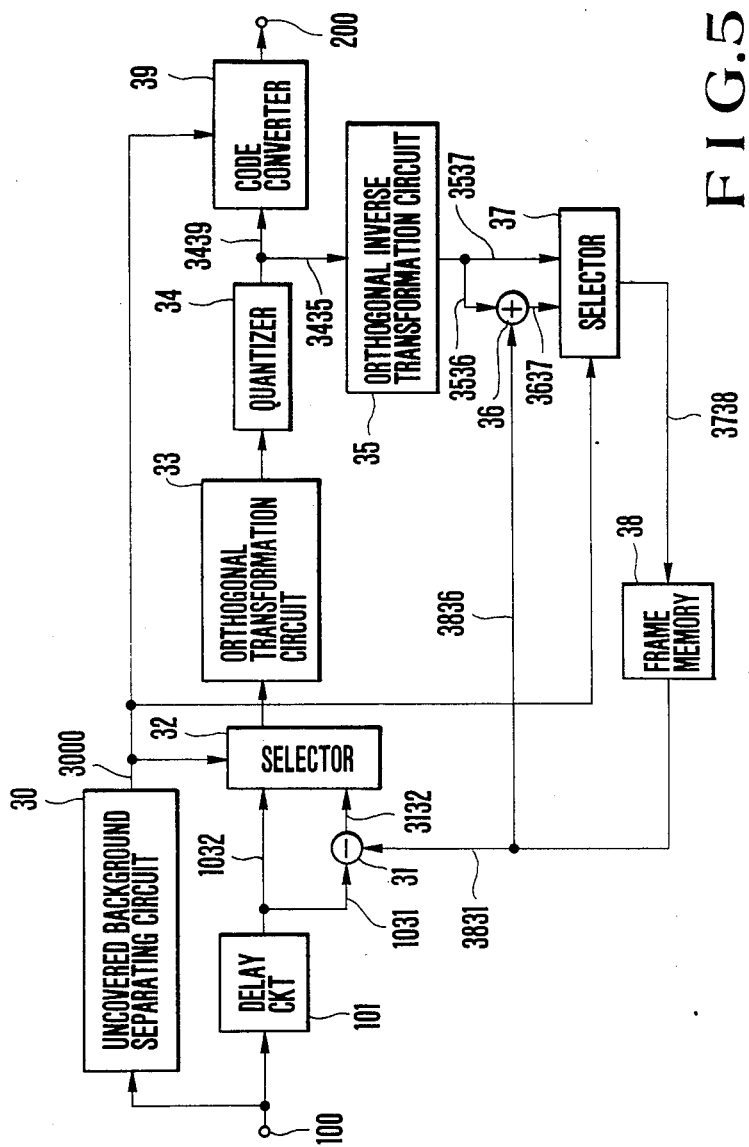
FIG. 5 is a block diagram showing an embodiment of a hybrid encoder according to the present invention.
Figure 6:
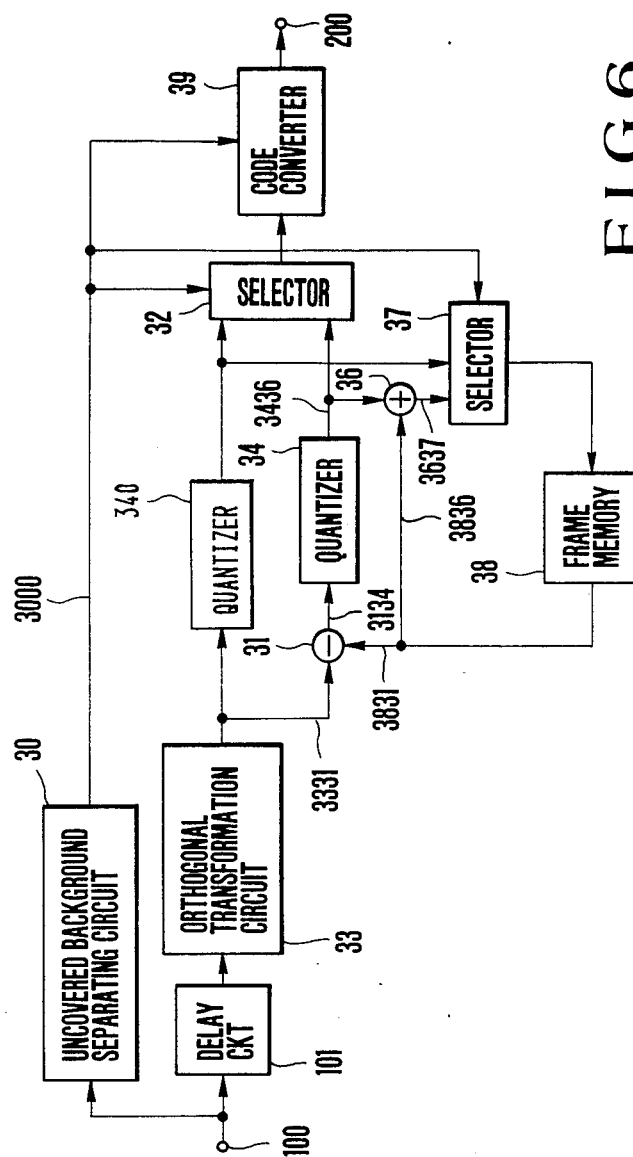
FIG. 6 is a block diagram showing another embodiment of a hybrid encoder according to the present invention.

FIGS. 5 and 6 show an embodiment of a hybrid encoder according to the present invention.

Referring to FIG. 5, a moving object image signal is input at an input terminal 100 and is supplied to an uncovered background separating circuit 30 and a delay circuit 101. The detailed arrangement of the uncovered background separating circuit 30 will be described later with reference to FIG. 7. The uncovered background separating circuit 30 separates an uncovered background area component from the input signal and sends logical "1" for the uncovered background ground area or logical "0" for other areas to selectors 32 and 37 and to a code converter 39 through a line 3000. The delay circuit 101 delays a signal by a delay time required for causing the uncovered background separating circuit 30 to separate the uncovered background area from other areas, and supplies the delayed signal to the selector 32 and a subtracter 31. The subtracter 31 subtracts an interframe correlation prediction signal (an interframe prediction signal or a motion compensated prediction signal, to be referred to as an interframe prediction signal hereinafter) supplied through a line 3831 from the delayed input moving object image signal supplied through a line 1031. A difference is supplied as the interframe prediction error to the selector 32. If the selector 32 receives the signal of logic "1" from the line 3000, it selects the input signal supplied through a line 1032. However, if the signal of logic "0" is supplied to the selector 32, it selects the interframe prediction error supplied from a line 3132. An orthogonal transformation circuit 33 performs orthogonal transformation, such as two-dimensional discrete cosine transformation, for the output from the selector 32. For example, a two-dimensional discrete cosine transformation circuit described in U.S. Pat. No. 4,302,775 "Digital Video Compression System And Methods Utilizing Scene Adaptive Coding with Rate Buffer Feedback" can be used. An output (transformation coefficient) from the orthogonal transformation circuit 33 is quantized by a quantizer 34. The quantized output is supplied to an orthogonal inverse transformation circuit 35 and the code converter 39. A two-dimensional discrete cosine inverse transformation circuit in the decoder side described in U.S. Pat. No. 4,302,775 can be used as the orthogonal inverse transformation circuit 35, and an output therefrom is supplied to the selector 37 and an adder 36. The adder 36 adds the interframe prediction signal supplied from a line 3836 and an output supplied from the orthogonal inverse transformation circuit 35 through a line 3536. The sum is supplied as a logical decoded signal to the selector 37. The selector 37 selects a line 3537 when it receives a signal of logic "1" supplied from the line 3000. However, the selector 37 selects the line 3637 when it receives a signal of logic "0". The selected signal is output to a frame memory 38. The frame memory 38 stores one-frame data supplied from the selector 37 through a line 3738. The one-frame signal is supplied as the interframe prediction signal to the subtracter 31 and the adder 36. If the motion compensated prediction signal is used in place of the interframe prediction signal, the frame memory 38 includes a variable delay circuit. The code converter 39 converts the uncovered background information supplied through the line 3000 and the quantized transformation coefficient supplied through a line 3439 to codes, such as Huffman codes, suitable for transmission. The converted codes are then sent onto a transmission line 200.

FIG. 6 shows another embodiment of a hybrid encoder.

An uncovered background area is separated from an input moving object image signal by an uncovered background separating circuit 30. The input signal is delayed by a delay circuit 101 by a delay time required for uncovered background separation. The delayed signal is supplied to an orthogonal transformation circuit 33. The orthogonal transformation circuit 33 performs orthogonal transformation of the delayed input moving object image signal. The resultant transformation coefficient is supplied to a quantizer 340 and a subtracter 31. The quantizer 340 quantizes the transformation coefficient and supplies the quantized transformation coefficient to selectors 32 and 37. The subtracter 31 subtracts the transformation coefficient interframe prediction value supplied through a line 3831 from the transformation coefficient supplied through a line 3331 to prepare an interframe prediction error. This error is output to a quantizer 34 through a line 3134. The interframe prediction value may be the motion compensated prediction value, as in FIG. 5. In this case, a frame memory 38 includes a variable delay function. The quantizer 34 quantizes the interframe prediction error of the transformation coefficient supplied through the line 3134. The quantized signal is then supplied to the adder 36 through a line 3436 and to the selector 32 through a line 3432. The adder 36 adds the output from the quantizer 34 and the interframe prediction value supplied through a line 3836. The sum is supplied as a logical decoded signal to the selector 37 through a line 3637. If a signal of logic "1" is supplied through a line 3000 to the selector 37, i.e., if the uncovered background area is designated, it selects a line 3332. However, if a signal of logic "0" is supplied to the selector 37, it selects the line 3637. The selected output is supplied to the frame memory 38. The frame memory 38 stores a one-frame local decoded signal and supplies it as the interframe prediction value to the subtracter 31 and the adder 36. The uncovered background separating circuit 30 separates the uncovered background area from the input signal. The separating circuit 30 supplies a signal of logic "1" for the uncovered background or a signal of logic "0" for other areas to the selectors 32 and 37 and the code converter 39. The selector 32 selects the line 3332 upon reception of the signal of logic "1" or the line 3432 upon reception of the signal of logic "0". The selected signal is output to the code converter 39. The uncovered background information supplied through the line 3000 and the output from the selector 32 are encoded by the code converter 39 to codes, such as Huffman codes, suitable for transmission, as in the code converter 39 in FIG. 5. These codes are sent onto a transmission line 200.

FIG. 7 shows a detailed arrangement of the uncovered background separating circuits 30 in FIGS. 5 and 6.

A moving object image signal is input to an input terminal 1030 and is supplied to delay circuits 13 and 16, frame memories 10 and 11, and a motion vector detector 12. The delay circuits 13 and 16 delay the input signal by a predetermined delay time required for calculating an interframe prediction value by means of the frame memory 10 and the delay circuit 14, and the motion compensated prediction value by means of the frame memory 10 and a variable delay circuit 15. Outputs from the delay circuits 13 and 16 are supplied to subtracters 17 and 18 through lines 1317 and 1618, respectively. The frame memory 10 can store a one-frame motion object image signal. The delay circuit 14 cooperates with the frame memory 10 to delay the input signal by one frame. A one-frame-delayed signal is output to the subtracter 17 through a line 1417. The subtracter 17 calculates an interframe difference according to the input signal supplied through the line 1317 and the one-frame-delayed signal supplied through the line 1417. The interframe difference is output to a comparator 19. The comparator 19 compares the interframe difference with a threshold value T. If the absolute value of the interframe difference is larger than the threshold value T, the comparator 19 supplies a signal of logic "1" to a memory 21. Otherwise, the comparator 19 supplies a signal of logic "0" to the memory 21.

The frame memory 11 stores a one-frame signal and serves as a motion vector detection memory. The motion vector detector described in Ninomiya's patent can be used as the motion vector detector 12. The input signal supplied through the line 1030 and the one-frame signal of the immediately preceding frame supplied through a line 1112 are used by the motion vector detector 12 to calculate a motion vector (adaptive prediction scheme) in accordance with block matching. The motion vector is output to the variable delay circuit 15 through a line 1215. The variable delay circuit 15 delays a frame memory output supplied through a line 1015 according to an adaptive prediction scheme, and supplies it as a motion compensated prediction value to the subtracter 18. The subtracter 18 calculates a difference between the input signal supplied through the line 1618 and the motion compensated prediction value supplied through a line 1518, and the motion compensated prediction error is supplied to a comparator 20. The comparator 20 compares the motion compensated prediction error with the threshold value T. If the absolute value of the motion compensated prediction error is larger than the threshold value T, the comparator 20 supplies a signal of logic "1" to a memory 22. Otherwise, the comparator 20 supplies a signal of logic "0" to the memory 22.

The memories 21 and 22 store the results of comparison between the interframe differences and the threshold values for a few frames, respectively.

Figures 8, 9:
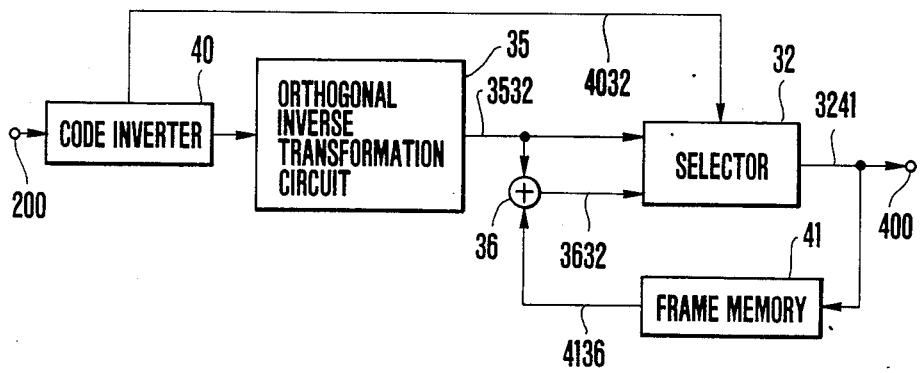
FIG. 8 is a logical table of decision results of a decision circuit in FIG. 7.
FIG. 9 is a block diagram showing an embodiment of a decoder according to the present invention.

A decision circuit 23 reads out the storage contents from the memories 21 and 22 and determines whether a given pixel (or block) belongs to the uncovered background area according to a predetermined algorithm. If the given pixel belongs to the uncovered background area, the decision circuit 23 outputs a signal of logic "1". Otherwise, the decision circuit 23 outputs a signal of logic "0". This arrangement can be achieved by a read-only memory (ROM) addressed by the comparison results. FIG. 8 shows the logical results of the decision circuit 23. Referring to FIG. 8, if the current motion compensated prediction error is larger than the threshold value, logical "1" is set in an address bit A3. Otherwise, logical "0" is set in the address bit A3. In the same manner as described above, logical "1" or "0" is set in address bits A2, A1, and A0 for the comparison results of one, two and three preceding frames. Similarly, the comparion results of the interframe differences are processed so that the comparison results of the interframe differences of current frame and one, two, and three preceding frames are set in address bits A7 to A4, respectively. Since the motion compensated prediction error has increased and is small one frame before the interframe difference decreases, the uncovered background is detected at address 116 (decimal), and the decision circuit 23 generates an output of logic "1".

Figure 10:
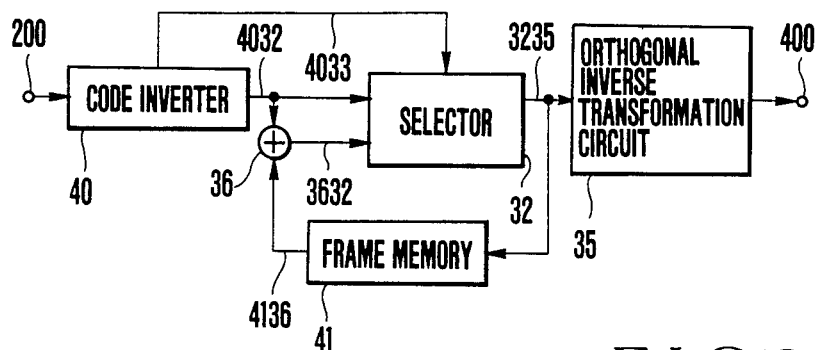
FIG. 10 is a block diagram showing another embodiment of a decoder according to the present invention.

FIG. 9 shows a hybrid decoder corresponding to the encoder of FIG. 5, and FIG. 10 shows a hybrid decoder corresponding to the encoder of FIG. 6.

Referring to FIG. 9, the coded uncovered background information and the orthogonal transformation result of the interframe prediction error or the moving object image signal are input from the transmission line 200. These input codes are inverted by a code inverter 40. The inverted uncovered background code is supplied to a selector 32 through a line 4032 and the inverted orthogonal transformation code is supplied to an orthogonal inverse transformation circuit 35. The two-dimensional discrete cosine inverse transformation circuit on the decoder side described in U.S. Pat. No. 4,302,775 can be used as the orthogonal inverse transformation circuit 35 in correspondence with the orthogonal transformation circuit at the coder side of FIG. 5. An output from the orthogonal inverse transformation circuit 35 is supplied to the selector 32 and an adder 36. The adder 36 adds a signal supplied through a line 3532 and a prediction signal supplied through a line 4136 to produce a decoded signal. This signal is output to the selector 32. The selector 32 selects the line 3532 upon reception of a signal of logic "1" (this signal represents the uncovered background area) through the line 4032. Otherwise, the selector 32 selects the line 3632. The selected signal is output to a frame memory 41 and an output terminal 400. The frame memory 41 stores a one-frame decoded signal supplied through a line 3241. This signal is supplied as the interframe prediction signal to the adder 36. The frame memory 41 includes a variable delay circuit when motion compensated prediction is performed by the encoder of FIG. 5.

The hybrid decoder in FIG. 10 will be described below. Coded uncovered background information and an interframe prediction error of a transformation coefficient or the transformation coefficient itself are input from a transmission line 200. These codes are inverted by a code inverter 40. The inverted uncovered background code is supplied to a selector 32 through a line 4033. The inverted interframe prediction error or transformation coefficient code is supplied to the selector 32 and an adder 36 through a line 4032. The adder 36 adds the signal supplied through the line 4032 and the prediction signal supplied through a line 4136 to produce a decoded signal. This signal is output to the selector 32. The selector 32 selects the line 4032 if it receives a signal representing the uncovered background area through the line 4033. Otherwise, the selector 32 selects a line 3632. The selected signal is output to an orthogonal inverse transformation circuit 35 and a frame memory 41. The frame memory 41 stores a one-frame selector 32 result supplied through a line 3235. The result is supplied as an interframe prediction signal to the adder 36. The frame memory 41 includes a variable delay function when motion compensated prediction is used at the encoder side of FIG. 6. The two-dimensional discrete cosine inverse transformation circuit at the decoder side described in U.S. Pat. No. 4,302,775 is used as the orthogonal inverse transformation circuit 35, in correspondence with the orthogonal transformation circuit 33 at the encoder side of FIG. 6. The transformation circuit 35 performs orthogonal inverse transformation of the selection result of the selector 32, which is supplied through the line 3235. The output from the transformation circuit 35 appears at an output terminal 400.

Figure 11:
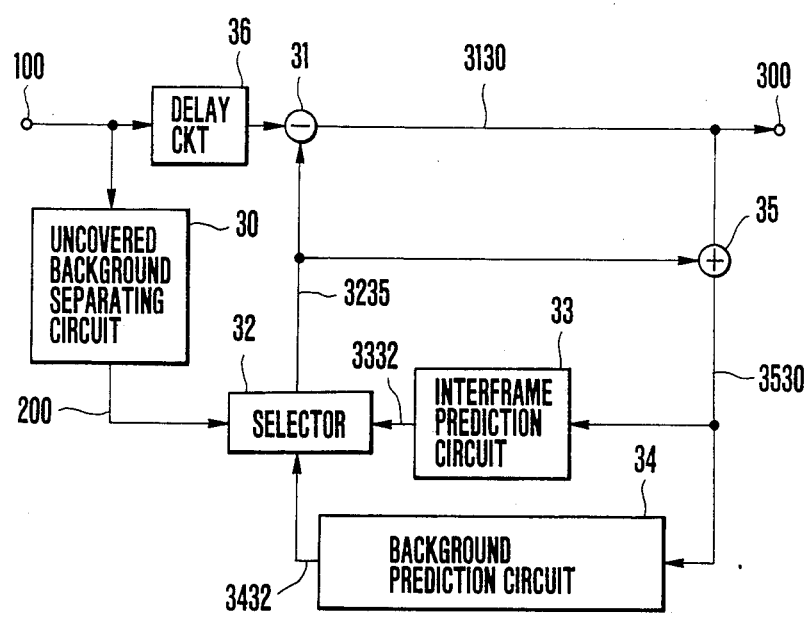
FIG. 11 is a block diagram showing an embodiment of an interframe adaptive coding apparatus according to the present invention.

FIG. 11 is an embodiment of an interframe adaptive prediction coding apparatus using the uncovered background separating circuit of FIG. 7. Referring to FIG. 11, a moving object image signal input to an input terminal 100 is supplied to an uncovered background separating circuit 30 and a delay circuit 36. The uncovered background separating circuit 30 separates an uncovered background area from the input signal. The separating circuit 30 generates a signal of logic "1" for the uncovered background area. Otherwise, the separating circuit 30 generates a signal of logic "0". An output from the separating circuit 30 is supplied to a selector 32. The selector 32 selects a background prediction value supplied from a background prediction circuit 34 through a line 3432 upon reception of a signal of logic "1" through a line 200. Otherwise, the selector 32 selects a prediction value obtained by using interframe correlation and supplied from an interface prediction circuit 33 through the line 3432. The selected signal is supplied to an adder 35 and a subtracter 31 through a line 3235. The delay circuit 36 delays the input signal by a delay time required for causing the uncovered background separating circuit 30 to separate the uncovered background area from the input signal. The delayed input signal is supplied to the subtracter 31. The subtracter 31 calculates a difference between the delayed input moving object image signal and the prediction value supplied through the line 3235 to produce a prediction error signal. This signal is supplied to an output terminal 300 and the adder 35 through a line 3130. The adder 35 adds the prediction error signal and the prediction signal supplied through the line 3235 to prepare a local decoded signal. This signal is supplied to the interframe prediction circuit 33 and the background prediction circuit 34 through a line 3530. The interframe prediction circuit 33 produces the prediction signal according to interframe correlation. The motion compensated interframe prediction circuit described in the Ninomiya's patent can be used as the interframe prediction circuit 33. The motion compensated interframe prediction signal is supplied to the selector 32 through a line 3332. The background prediction circuit 34 produces the background prediction signal including the uncovered background area and can be exemplified by Kuroda's patent. The background prediction signal is supplied to the selector 32 through the line 3432.

FIG. 12 is a noise reduction circuit for reducing noise of a moving object image signal according to moving object image interframe correlation. According to the principle of operation of this noise reduction circuit, motion of a moving object is detected according to the moving object image signal, an uncovered background area appearing upon movement of the moving object is detected, and neither switching of nonlinear circuit characteristics is performed nor is it used to reduce quantization noise. Therefore, a tail following the moving object does not occur and the degradation of image quality can be prevented.

Referring to FIG. 12, an input moving object image signal is supplied to a subtracter 51 through a line 101. The subtracter 51 calculates a difference between the input moving object image signal and a one-frame delayed prediction signal supplied from a frame memory 56. The difference signal is supplied to a nonlinear circuit 54 and to an uncovered background detector 52 through a line 102. The uncovered background detector 52 detects motion of the moving object according to the difference signal supplied from the subtracter 51 and determines the uncovered background area according to the motion signal. An inhibit signal is supplied from the uncovered background detector 52 to the nonlinear circuit 54 to inhibit switching of the nonlinear circuit characteristics or operation thereof.

The moving object image signal is separated into a moving portion and a still portion. Several separation techniques are known. For example, in Japanese Patent Application No. 59-194110 entitled "Motion/Still Area Separation Apparatus for Moving Object Image Signal", each frame is divided into blocks. Absolute values of interframe differences of intrablock pixels are added to each other. The sum is then compared with a predetermined threshold value to determine whether the block is a moving portion or a still portion. Alternatively, a gradient method can be used instead of the technique described above. In this case, a motion vector is calculated from an intraframe luminance gradient and an interframe difference in units of pixels. A set of pixels whose motion vectors are not zero is determined as a motion area. Either method may be used in the present invention.

The nonlinear circuit 54 provides a gain of less than 1 for a small amplitude of a difference signal supplied from the subtracter 51 while the inhibit signal from the uncovered background detector 52 is disabled. The nonlinear circuit 54 provides a gain of 1 for a difference signal of large amplitude. However, if the inhibit signal is supplied from the uncovered background detector 52 to the nonlinear circuit 54, it provides a gain of 1 or near 1 regardless of the input amplitude, thereby reducing the signal distortion.

An output from the nonlinear circuit 54 is supplied to an adder 55. The adder 55 adds the output signal from the nonlinear circuit 54 and the prediction signal supplied from the frame memory 56. The output from the adder 55 is supplied to the frame memory 56 and appears as a noise-reduced moving object image signal through a line 501. The frame memory 56 also delays the noise-reduced moving object image signal by one frame and supplies it as a prediction signal to the subtracter 51 and the adder 55.

FIG. 13 is a block diagram showing an embodiment of an uncovered background detector 52 using an interframe difference. Referring to FIG. 13, a difference signal is supplied from a subtracter 51 through a line 102 to a threshold circuit 204. The threshold circuit 204 compares an input signal with a predetermined threshold value and determines if a significant difference is detected. A set of signals having significant differences is regarded as a motion area. The significant difference signal from the threshold circuit 204 is supplied to a memory 201 and a decision circuit 202. The memory 201 comprises a one-bit frame memory for storing a significant difference signal, i.e., data representing a motion area. The memory 201 temporarily stores the significant difference signal supplied from the threshold circuit 204 for a frame A and supplies the significant difference signal of the frame A to the decision circuit 202 when the next significant difference signal, i.e., the signal of a frame B is supplied thereto. At the same time, the memory 201 stores the significant difference signal of the frame B. The decision circuit 202 compares the significant difference signal of the frame A with that of the frame B. In this case, if a moving portion in the previous frame represents a still portion in the current frame, this portion is regarded as the uncovered background area. The signal representing the uncovered background area, determined by the decision circuit 202, is supplied as the inhibit signal to a nonlinear circuit 54 through a line 203.

If the gradient method is used in the uncovered background detector 52, the threshold circuit 204 can be replaced with an uncovered background detector using the gradient method.

If the inhibit signal is generated in units of blocks, an accumulator can be arranged to accumulate the outputs from the threshold circuit 204 in units of blocks. An output from the accumulator is then supplied to the memory 201 and the decision circuit 202.

What is claimed is:

1. A coding apparatus for a moving object image input signal, comprising: detecting means for receiving the moving object image input signal and detecting an uncovered background area appearing upon movement of a moving object; means for performing interframe prediction coding for the moving object image input signal; means for selecting one of an output signal from said prediction coding means and the moving object input signal in response to an output signal from said detecting means; and means for coding a signal selected and output from said selecting means according to intraframe correlation.

2. A coding apparatus for a moving object image input signal, comprising: means for calculating a prediction value of the moving object image input signal based on a locally decoded signal, according to interframe correlation and performing predictive coding thereof; means for separating an uncovered background area appearing upon movement of a moving object; first selecting means for selecting one of an interframe prediction error and the moving object image input signal according to a separation result; means for coding the selection result according to intraframe correlation; first decoding means corresponding to said coding means according to the intraframe correlation; second decoding means for adding the prediction value obtained by the interframe correlation to a decoding result from said first decoding means; and second selecting means for selecting one of outputs from said first and second decoding means according to the same selection rule as that of said first selecting means and producing said locally decoded signal.

3. A decoding apparatus for a moving object image input signal, for decoding a coded moving object image signal which is coded by adopting, for at least an uncovered background area appearing upon movement of a moving object, a redundancy reduction technique which, in selection of one of the moving object input signal and a prediction error obtained by using interframe correlation, uses intraframe correlation for a result obtained upon selection of the moving object input signal, comprising: first decoding means for decoding the coded moving object image signal according to intraframe correlation; means for generating a prediction signal using interframe correlation; second decoding means for performing decoding using the prediction signal and an output from said first decoding means; means for selecting an output from said first decoding means for at least the uncovered background area in order to select one of the outputs from said first and second decoding means; and delay means for delaying an output from said selecting means by a delay time corresponding to one frame of the moving object image and for generating the prediction signal.

4. A coding apparatus for a moving object image input signal, comprising: means for separating an uncovered background area from the moving object image input signal such as a television signal; first coding means for performing coding using intraframe correlation; second coding means for calculating a prediction value of a coding result from said first coding means according to interframe correlation and for performing predictive coding; decoding means for adding a coding result from said second coding means to the prediction value obtained using the interframe correlation; first selecting means for selecting one of the first and second coding results according to an uncovered background separation result; and second selecting means selecting one of the first coding result and the decoding results according to the same selection rule as that of said first selecting means.

5. A decoding apparatus for a moving object image signal, for decoding a coded moving object image signal which is coded by selecting, in selection of one of a first coding result obtained by coding an input moving object image signal according to intraframe correlation and a second coding result obtained by applying a redundancy reduction technique using interframe correlation to the first coding result, the first coding result at least for an uncovered background area appearing upon movement of a moving object, comprising: first decoding means for performing decoding by using the coded moving object image signal and a prediction signal generated according to interframe correlation; means for selecting the coded moving object image signal for at least the uncovered background area in selection of one of an output from said first decoding means and the coded moving object image signal; second decoding means for decoding an output from said selecting means according to intraframe correlation; and means for delaying the output from said selecting means by a delay time corresponding to one frame of the moving object image and for generating the prediction signal.

6. An adaptive predictive coding apparatus for a moving object image signal, comprising means for performing motion-compensated prediction for the moving object image signal, such as a television signal, and calculating a prediction error; first evaluating means for evaluating the motion compensated prediction error; means for performing interframe prediction for the moving object image signal and calculating an interframe prediction error; second evaluating means for evaluating the interframe prediction error; means for storing first and second evaluation results from said first and second evaluating means; third evaluating means for comparing the first and second evaluation results stored in said storage means and detecting an uncovered background upon movement of a moving object; means for performing predictive coding using an interframe correlation; means for performing background predictive coding using a background memory; and means for selecting predictive coding using said background memory for the uncovered background and for selecting predictive coding using the interframe correlation for other screen components.

7. A coding apparatus for a moving object image signal, comprising means for detecting, from an input moving object image signal, an uncovered background appearing upon movement of a moving object; and means for reducing noise of the input signal, said noise reduction means being adapted to receive a signal representing the uncovered background from said detecting means and lowering a noise reduction effect.

8. An apparatus according to claim 7, wherein said noise reduction means includes a nonlinear circuit for receiving the interframe difference signal, said nonlinear circuit being adapted to provide a gain of less than 1 if a magnitude of the interframe difference signal is small and a gain of 1 if the magnitude is large while the uncovered background detection signal is not supplied thereto, and said nonlinear circuit being adapted to provide a gain of 1 or near 1 regardless of the magnitude of the interframe difference signal while the uncovered background detection signal is supplied thereto.

* * * * *